June 20, 1944.    N. E. LAUTERBACH    2,351,822
DISPLAY DEVICE
Filed May 13, 1941
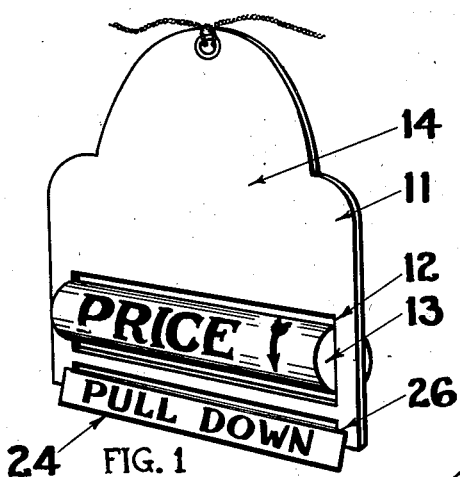
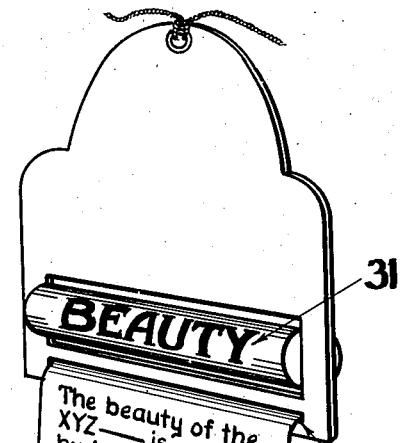
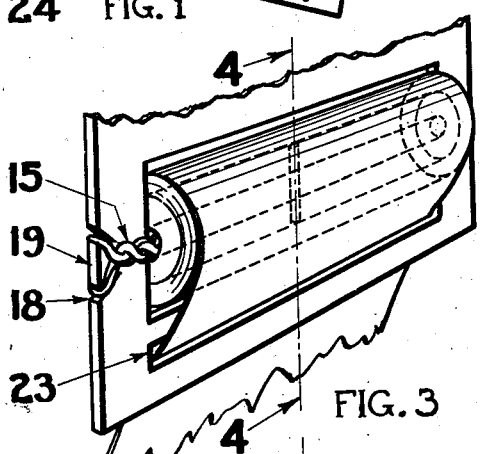
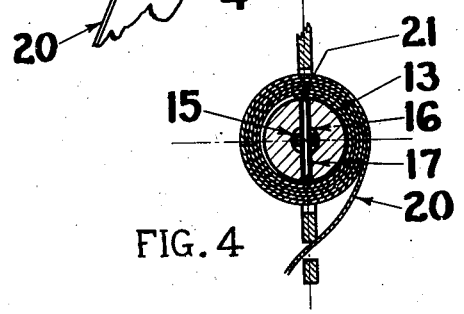
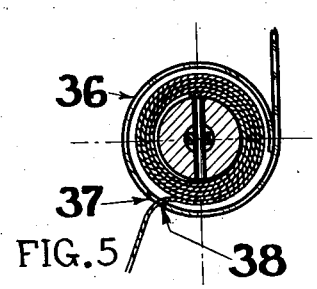
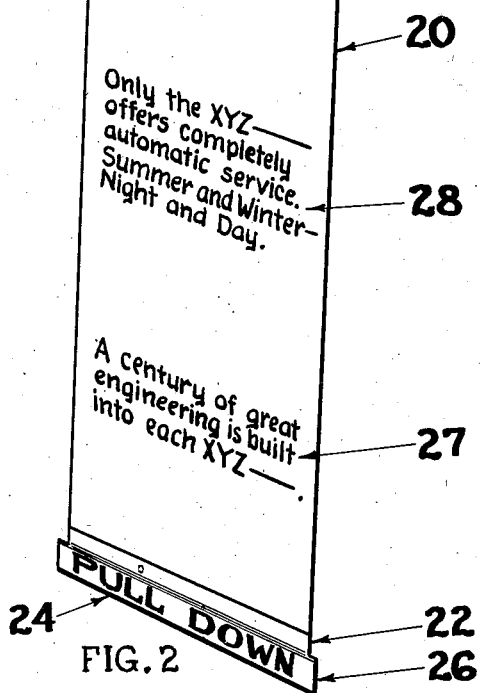
INVENTOR.
Norman E. Lauterbach
BY
Winslow E. Thomas Patented June 20, 1944

2,351,822

UNITED STATES PATENT OFFICE 2,351,822

DISPLAY DEVICE

Norman E. Lauterbach, Newark, N. Y.

Application May 13, 1941, Serial No. 393,203

3 Claims. (Cl. 40—85)

My invention relates to a display device and, more particularly to a combination advertising and price tag adapted for use in connection with the display and sale of merchandise.

I have found when merchandise is displayed, for example, in a show room, particularly in connection with expensive articles such as refrigerators, washing machines, electric stoves, and so forth, that the prospective customer frequently loses interest in the merchandise immediately upon ascertaining the price. It is customary when such articles are displayed to place a price tag on the refrigerator or other article. Prospective customers frequently fail to take note of the features of merit about the article and are prone to look at the price almost before even looking at the article. If the price is high and a salesman is not at hand to point out the advantages of the more expensive article, the customer will frequently direct his attention to the cheaper articles in the display room without considering to the desired extent the more expensive articles.

An object of my invention is to provide an advertising and display tag of simple construction adapted for advantageous use in connection with the display and sale of articles of merchandise.

Another object of my invention is to provide an advertising and price tag for use on articles of merchandise wherein the prospective customer is substantially forced to read advertising material on the tag pointing out the advantages of the merchandise, before ascertaining the price.

Other objects and advantages of my invention will be pointed out in the claims and will be apparent from the following description, when taken in connection with the accompanying drawing, in which:

Fig. 1 is a front perspective view of my novel advertising and price tag;

Fig. 2 is a view similar to Fig. 1 with the sheet upon which the advertising matter and price appear in an extended position;

Fig. 3 is a rear perspective view of the advertising and price tag with parts thereof shown in dotted lines to better illustrate the invention;

Fig. 4 is a sectional view taken substantially on the line 4—4 of Fig. 3;

Fig. 5 is a sectional view, similar to Fig. 4, illustrating a modification of my invention.

While the device of my invention may have other uses, it is particularly designed as an advertising and price tag or card for use in connection with the sale of merchandise. In the preferred form of the invention the advertising and price tag comprises a flat sheet of material or main body 11, which may be provided with suitable means, as indicated, for attaching the price tag to the merchandise. The material 11, may be of any suitable character such as sheet metal, but preferably for economy of fabrication, the main portion of the display tag may be a flat sheet of paper board material.

The paper board 11 is preferably provided with an elongated substantially rectangular opening 12 in which may be mounted, in a manner presently described, a rotatable member or roll 13. The upper part 14 of the price tag may be employed to set forth the name of the manufacturer of the article in connection with which the price tag is to be employed should this be desired.

The roll 13, as shown most clearly in Fig. 4, is preferably substantially cylindrical in shape and may be made of wood, paper or any other suitable material. The roll 13 is preferably provided with an opening or bore 16 which extends therethrough from one end to the other. A pin 17 extends diametrically through the roll and through the bore preferably centrally thereof, in the manner indicated in solid lines in Fig. 4 and in dotted lines in Fig. 3. An elastic band 15 extends through the bore 16 on opposite sides of the pin 17 and has its ends twisted so as to tension the band and thus tension the roll. The ends of the elastic band may be secured to the cardboard body portion 11 of the display tag in any suitable manner. One convenient way of securing the elastic band in position is to provide a pair of notches 18 at each side edge of the cardboard. The ends of the elastic band may then be looped over the part 19 of the cardboard lying between the notches.

One important feature of my invention lies in the fact that the elastic band not only serves as a tensioning means for the roll but also serves to support the roll so that the roll lies in the opening 12 of the display tag. This method of supporting and tensioning the roll permits convenient detachment of the roll from the card and replacement with a new roll should this be desired. While a spring might be employed to tension the roll, the arrangement shown is preferable. Moreover, if a spring located at one end of the roll were employed, separate means would be required to support the roll from the display card which would increase the manufacturing problems due to the fact that I prefer to use thin cardboard for the support.

Wound on the roll is a sheet 20 which may be of paper, fabric or any other suitable material. One end of the sheet is attached, as indicated at 21, to the roll in any suitable manner. The free end 22 of the sheet extends in a wound manner rearward around the roll and then is brought forward and preferably extended through a slot or opening 23 provided in the cardboard.

The free end of the sheet is provided with a stiffened edge 24 of any suitable material. The stiffened edge may be formed by adhesively securing to the end of the sheet a material similar to that used for forming card index tabs. The side edges of the stiffened material are extended beyond the side edges of the sheet, as indicated at 26, to provide projections adapted to engage the side margins of the slot 23 when the sheet is rolled up, as shown in Fig. 1. The corners of the stiffened edge thus act as a stop so that tension may be maintained on the roll when the sheet is in its rolled position (Fig. 1).

In the particular embodiment of my invention shown, the forward or front face of the sheet is provided with a series of short descriptions setting forth the advantages of or drawing attention to specific features of the merchandise with which the price tag is to be used. Any desired number of short descriptions may be employed. In the drawing I have shown three, numbered for identification 27, 28, and 29. On the reverse or back side of the sheet additional written matter is provided. This written matter may constitute headings for the advertising material appearing on the forward side of the sheet. For example, in the case of the advertising matter 29 I have shown a heading 31. This heading "Beauty" is the topic of the advertising matter 29.

It will be particularly noted that the headings are upside down on the back of the sheet so that as the sheet is unrolled the heading 31 appears right side up when the price and advertising tag is viewed from the front. Moreover the heading is spaced properly along the sheet (toward the point of attachment of the sheet to the roll) from the advertising material so that the heading 31 lies directly above the descriptive material 29 when the descriptive material becomes visible. The heading thus as the sheet is pulled down flashes into view and tends to arrest the attention of the prospective customer so as to direct his attention to the descriptive matter.

Of particular importance is the fact that the sheet is wound rearward on the roll and then extends forward through the slot 23 which brings the plane of the sheet when pulled out, as shown in Fig. 2, into substantially a common plane with the heading 31. This enables the prospective customer to read the heading and the advertising matter, associated therewith, more readily. While I have shown only one heading it will be appreciated that headings may be employed, if desired, in connection with the advertising matters 27 and 28. Moreover, I have not shown a price mark on the sheet but it will be appreciated that, if desired, the price may be placed as the last item on the sheet either in a position such that it appears on the front face of the sheet or so that it appears as a heading. Thus it becomes necessary for the prospective customer to unroll the sheet completely before he ascertains the price.

In Fig. 5 I have shown a modification of my invention. The construction and arrangement of the written matter on the sheet may be substantially the same as that described above. However, in this case the roll is enclosed in a housing 36 made preferably of a transparent material such as Celluloid or glass. It will be noted that the housing 36 has a slot 37 through which the free end of the sheet extends. The slot is preferably located so as to bring the plane of the sheet substantially into the plane of the forward face of the roll for the purpose above mentioned.

The edge 38 may, if desired, be beveled to avoid damaging the sheet as the sheet slides through the slot.

The display device described provides a combined advertising and price tag which attracts interest when used and is a distinct aid in drawing attention to the salient features of the merchandise with which it is used. While I have shown and described the preferred forms of my invention, various changes and modifications may be made therein, particularly in the form and relation of parts, without departing from the spirit of my invention as set forth in the appended claims.

I claim:

1. A display device comprising a support, a rotatable member carried by said support, a sheet of material having one end attached to said member its intermediate portions wound upon said member and its other end free, and means for normally maintaining said sheet in wound condition on said member, said sheet having written advertising matter on the forward side thereof and a heading for the advertising matter on the opposite side thereof, said heading being spaced toward the attached end of the sheet from the advertising matter and being in upside down relation thereto, and means in connection with the support for bringing the heading and the advertising matter into a substantially common plane as the sheet is unwound so that the heading and the advertising matter may be conveniently read together.

2. A display device comprising a support, a rotatable member carried by said support, a sheet of material having one end attached to said member its intermediate portions wound upon said member and its other end free, said sheet having written matter on the forward side thereof and related written matter on the rearward side thereof, said related written matter being spaced toward the attached end of the sheet from the written matter on the forward side and being in upside down relation thereto, the arrangement of written matter being such that the written matter on opposite sides of the sheet may be read from the forward side of the sheet as a continuous statement as the sheet is unwound and means in connection with the support for bringing the printed matter on opposite sides of the sheet into substantially a common plane.

3. A display device comprising a support, a rotatable member carried by said support, a sheet of material having one end attached to said member its intermediate portions wound upon said member and its other end free, said sheet having written matter on the forward side thereof and related written matter on the rearward side thereof, said related written matter being spaced toward the attached end of the sheet from the written matter on the forward side and being in upside down relation thereto, the sheet being wound with the free end extending downward at the rear of the device so that the rearward face of a portion of the sheet may be seen while still on the roll and simultaneously with the written matter on the forward side of the sheet.

NORMAN E. LAUTERBACH.